United States Patent [19]

Berg

[11] Patent Number: 5,031,347
[45] Date of Patent: Jul. 16, 1991

[54] VEHICLE DISTRESS SIGN AND METHOD OF MAKING SAME

[76] Inventor: Douglas C. Berg, 1341 Highland St., Columbus, Ohio 43201

[21] Appl. No.: 172,788

[22] Filed: May 12, 1988

[51] Int. Cl.$^5$ ............................................. G09F 21/04
[52] U.S. Cl. ........................................ 40/591; 40/539; 40/617
[58] Field of Search ................ 40/591, 617, 539, 610, 40/592

[56] References Cited

U.S. PATENT DOCUMENTS

| | | | |
|---|---|---|---|
| 4,091,553 | 5/1978 | Glennie | 40/617 |
| 4,178,874 | 12/1979 | Berns et al. | 40/591 |
| 4,348,978 | 9/1982 | Brucato | 40/591 |
| 4,375,134 | 3/1983 | Sheetz | 40/591 |

*Primary Examiner*—Kenneth J. Dorner
*Assistant Examiner*—J. R. Hakomaki
*Attorney, Agent, or Firm*—Porter, Wright, Morris & Arthur

[57] ABSTRACT

A sheet of polyethylene stock material is die cut to form an elongated display board with mounting tabs at opposite ends thereof. A central hinge is heat scored on the display board to form a transverse midline, and outlying hinges are heat scored between the opposing ends of the display board and adjoining mounting tabs. A reflective background is applied to reversible surfaces of the display board, and separate messages are silk screened on each surface. One message includes a triangular "hazard" symbol on each side of the central hinge. The other message includes the word "HELP" on each side of the central hinge. In use, the operator rolls down a side window of the vehicle, places the mounting tabs thereon in spaced relation to one another so that the display board is in a V-shaped configuration, then rolls up the window to sandwich the mounting tabs between the window and the door frame, thereby holding the sign so that the message on one surface of the display board may be seen by traffic traveling in opposite directions.

10 Claims, 1 Drawing Sheet

VEHICLE DISTRESS SIGN AND METHOD OF MAKING SAME

TECHNICAL FIELD

The present invention relates to signs adapted for attachment to highway vehicles, and more particularly to relatively compact distress signs which are readily attachable to and detachable from the vehicle.

BACKGROUND ART

In the past, motorists have used a variety of devices and techniques for indicating distress and caution to other drivers. Typically, a white piece of cloth would be tied to the radio or telephone antenna, the hood would be raised, flares would be lit, or some combination of the above would be attempted. These devices were often ineffective at obtaining assistance, either because passing motorists did not know what they meant or did not see them. Furthermore, they all required the motorist in distress to get out of the car, thereby increasing the danger inherent in a highway emergency and/or vehicle breakdown.

The closest prior art known to the applicant are U.S. Pat. Nos. 4,062,139 to Klosel, 4,609,133 to Anderson and 3,903,629 to Gruna. The Klosel patent discloses a vehicle distress sign comprising a pair of boards pivotally connected at a flexible junction. Information sheets are also attached at this junction, which is formed by a spiral support or clamp. The boards and sheets may be folded together into a compact structure for storage. In use, the boards are disposed in an inverted V-shaped formation and are held in position by a strap. The assembled sign is held on top of the distressed vehicle by a magnet in the strap. The Anderson patent discloses a collapsible sign frame which includes a bracket mountable on a car window. The window may be elevated to sandwich the upper edge of the bracket between the window and its socket. The sign itself projects above the top of the car. The Gruna patent discloses a vehicle emergency sign provided with a flexible strap which can be gripped between a car window and the window frame, with the sign body suspended therebelow.

There are certain disadvantages to the vehicle signs disclosed in these patents. The Klosel sign is relatively complex in construction. The Anderson sign is both complex in construction and cumbersome. The Gruna device would tend to wave in the wind and would be difficult to read.

Thus, the present inventor was faced with the problems of devising a highway distress sign which is relatively compact and inexpensive, capable of displaying multiple messages, readily attachable to and detachable from the vehicle without requiring the operator to emerge therefrom, held securely in position when in use, and visible to traffic traveling in opposite directions.

SUMMARY AND OBJECTS OF THE INVENTION

The present invention is a sign for temporary attachment to a vehicle equipped with at least one movable side window. The present sign comprises a display board, a central hinge portion defining a transversely extending midline on the display board, mounting components projecting from opposite ends of the display board for releasably engaging the vehicle side window, outlying hinge portions connecting the mounting components to the display board and a message placed on at least one surface of the display board on each side of the central hinge portion. The present invention also includes a method of making the above-described sign. This method basically comprises cutting stock sheet material to define the display board and mounting components projecting from opposite ends of the board, forming the central and outlying hinge portions and applying the message to at least one surface of the display board on each side of the central hinge portion.

Some of the primary objects of the present invention are to provide a highway distress sign which is readily visible to traffic moving in opposite directions and one that is sufficiently sturdy to maintain its position when in use. Another object is to provide a vehicle distress sign that is durable and can be folded into a compact structure for storage. Yet another object is to provide a highway distress sign that can be erected without forcing the operator to leave the vehicle. Further objects and advantages of the present highway sign may be more apparent in view of the following drawings and detailed description of the preferred embodiment.

BEST MODE FOR CARRYING OUT THE INVENTION

Figure 1:
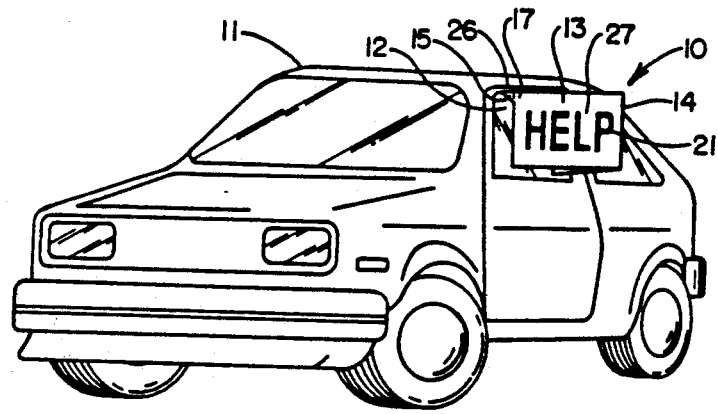
FIG. 1 is a perspective view of a vehicle to which a highway distress sign embodying the present invention is operatively attached.

As indicated in the drawings, the present sign, generally designated 10, is adapted for temporary attachment to a vehicle 11 which is equipped, in the usual manner, with at least one movable side window 12. The sign 10 basically comprises a display board 13, a central hinge portion 14 defining a transversely extending midline on the sheet, mounting flaps 15 and 16 projecting from opposite ends 17 and 18, respectively, of the display board 13 for releasably engaging the side window 12 of the vehicle 11, relatively outlying hinge portions 19 and 20 connecting the mounting portions 15 and 16, respectively, to the display board 13, and a message 21 (FIG. 1) disposed on at least one surface of the display board 13 on each side of the central hinge portions 14. Typically, the sign 10 is mounted on the driver's side window 12 of the car or truck 11; however, it may be mounted on the passenger's side window or on any other movable window of the vehicle, as the situation warrants.

Figure 2:
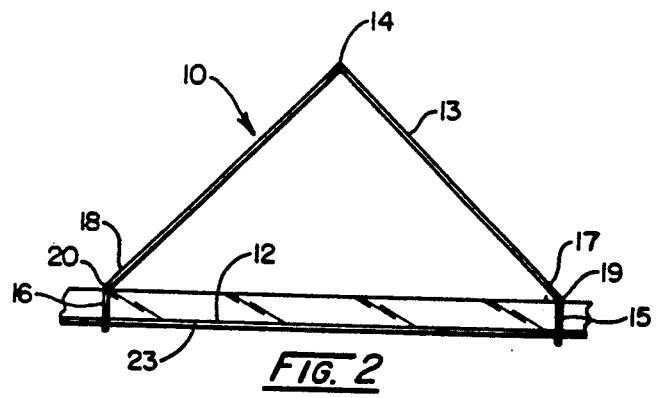
FIG. 2 is an enlarged fragmentary top plan view of the present sign and a portion of a side window of the vehicle to which it is attached.
Figure 3:
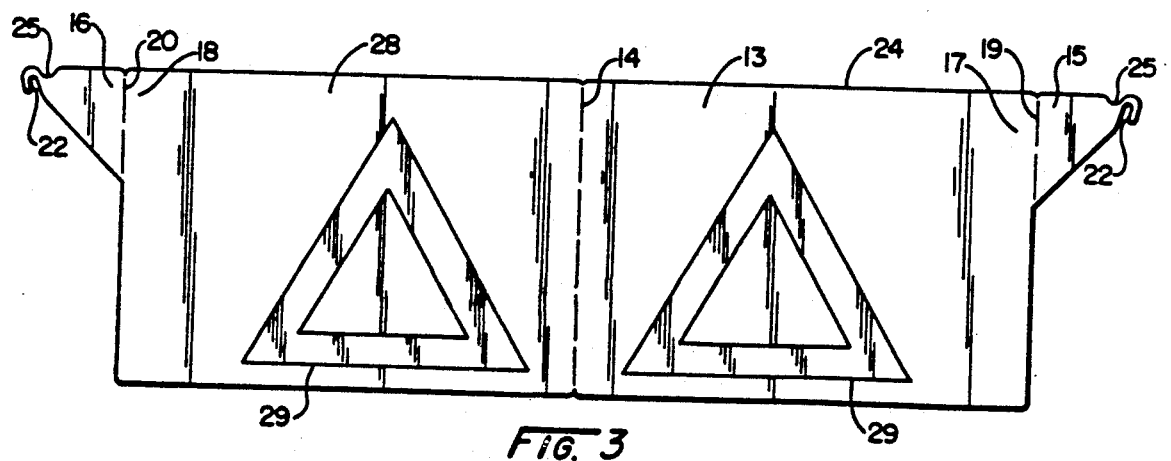
FIG. 3 is a further enlarged elevational view of a reverse surface of the present sign, and particularly illustrates the various features of the present invention as they appear when the sign is completely unfolded.

The present sign 10 is adapted to be releasably held in a generally V-shaped configuration projecting laterally outwardly from the vehicle window 12, as indicated in FIGS. 1 and 2. The mounting portions 15 and 16 comprise a pair of flaps or tabs, each of which is formed with a slot 22 adapted to releasably receive an edge portion 23 (FIG. 2) of the window 12. As best indicated in FIG. 3, the mounting flaps 15 and 16 and the associated slots 22 are disposed near the upper edge 24 of the display board 13. In this manner, the adjacent ends 17, 18 of the display board 13 are advantageously disposed to contact the side window 12 along substantially their entire length and thereby assist in supporting the sign in its V-shaped configuration when in use.

It is also advantageous to provide a groove 25 in each of the flaps 15, 16 along upper edges thereof in relatively offset, opposing relation to the slots 22. The grooves 25 are, in effect, disposed to releasably engage a portion 26 (FIG. 1) of the vehicle adjacent to the window. Typically, the groove-receiving portion 26 of the car comprises the upper edge of the side door frame which is adapted to house the upper edge 23 of the window when said window closed. As may be readily understood, by hooking the slots 22 on the upper edge 23 of the window 12 and by rolling the window up to sandwich the grooves 25 against the upper, window-receiving frame member 26 of the door, the tabs 15 and 16 are held securely in spaced relation to one another, thereby maintaining the display board 13 in its V-shaped configuration during use.

Preferably, the display board 13 and mounting portions 15, 16 are of one piece construction and are die cut or stamped in the usual manner from stock sheet material, such as 0.055 gauge polyethylene. By using a synthetic resin material such as polyethylene, the central and outlying hinge portions 14, 19, 20 may be integrally formed by heat scoring the sign 10 at the designated places, thereby forming "live" hinges. In this manner, the sign 10 is reversible and may be mounted on the vehicle 11 with either one surface 27 (FIG. 1) or an opposing surface 28 (FIG. 3) being displayed.

A reflective background, such as safety yellow, is preferably applied to the reversible surfaces 27, 28 of the sign 10 before it is die cut from the sheet of polyethylene stock material. Next, the unit is heat scored to define the living hinges 14, 19 and 20. The unit is then silk screened on each surface, preferably with black ink, to impart one message 21 (FIG. 1), such as "HELP", on one surface 27 and another message 29 (FIG. 3), such as the international symbol for a hazard or slow moving vehicle, on the opposite surface 28. Each message 21, 29 appears twice on its respective surface 27, 28, one on each side of the central hinge 14. In this manner, the message may be seen by traffic traveling in opposite directions when the sign is installed in its V-shaped configuration on the vehicle window.

Advantageously, by heat scoring the polyethylene material to define the central 14 and outlying 19, 10 hinges, the sign 10 may be folded compactly for storage in the glove compartment or under a seat of the vehicle. In addition, these live hinges permit the sign to be reversible, while possessing sufficient strength through repeated foldings and unfoldings to maintain their integrity for years of use.

In order to use the sign 10, the operator simply removes it from its storage area, unfolds it, rolls down the driver's side window 12, positions the display board 13 in a V-shaped configuration outside the window 12, attaches the flaps 15, 16 in spaced relation to one another (approximately 1 foot apart), via the slots 22, upon the upper edge 23 of the window 12, and raises the window until the flap grooves 25 engage the upper portion 26 of the door into which the window fits. Once help has arrived or the hazard no longer exists, the operator simply lowers the window, removes the sign, folds it along its live hinges 14, 19 and 20, and stores it in the glove compartment, under a seat or in another convenient place.

In this manner, a highway distress sign is provided which is compact and durable, which alerts traffic in both directions, and which is attached and detached easily without forcing the operator to leave the vehicle.

While a single preferred embodiment of the present invention has been illustrated and described in some detail, many modifications, substitutions and alterations may be made without departing from the spirit of the invention or the scope of the following claims.

I claim:

1. A sign for temporary attachment to a vehicle equipped with at least one movable side window, said sign comprising: a display board, first hinge means defining a transversely extending midline on said display board, first and second mounting flaps projecting from opposite ends of said display board, each of said mounting flaps being formed with a slot adapted to releasably receive an edge portion of the vehicle side window, second and third hinge means connected the first and second mounting flaps, respectively, to the display board, and a message disposed on at least one surface of the display board on each side of the first hinge means.

2. A sign for temporary attachment to a vehicle equipped with at least one movable side window, said sign comprising: a display board, first hinge means defining a transversely extending midline on said display board, first and second mounting flaps projecting from opposite ends of said display board for releasably engaging the vehicle side window, each of said mounting flaps being formed with a groove adapted to releasably engage a portion of the vehicle adjacent to said side window, second and third hinge means connecting the first and second mounting means, respectively, to the display board, and a message disposed on at least one surface of the display board on each side of the first hinge means.

3. The sign according to claim 1, wherein the display board is adapted to be releasably held by the first and second mounting flaps in a generally V-shaped configuration projecting laterally outwardly from the vehicle side window.

4. The sign according to claim 1, wherein a reflective background is disposed on at least one surface of the display board in underlying relation to the message.

5. The sign according to claim 1, wherein the display board, first and second mounting flaps, first, second and third hinge means are all integrally formed from synthetic resin material.

6. The sign according to claim 1, wherein the display board includes relatively reversable, first and second surfaces and wherein a first message is provided on the first surface and a second message is provided on the second surface.

7. A method of making a sign for temporary attachment to a vehicle equipped with at least one movable side window, said method comprising:

(a) cutting stock sheet material to define a display board and mounting means projecting from opposite ends of the display board, said mounting means being shaped to releasably engage the side window of the vehicle;

(b) forming first hinge means to define a transversely extending midline on the display board;

(c) forming second hinge means between the mounting means and opposite ends of the display board; and (d) applying a message to at least one surface of the display board on each side of the first hinge means.

8. The method according to claim 7, wherein the stock sheet material is a synthetic resin and the first and second hinge means are formed by heat scoring the sign.

9. The method according to claim 7, which includes applying a reflective background to at least one surface of the display board in underlying relation to the message.

10. The method according to claim 7, which includes applying a reflective background to relatively reversible, first and second surfaces of the display board and applying a first message to the first surface and a second message to the second surface.

* * * * *